(12) United States Patent
Kim et al.

(10) Patent No.: US 10,447,443 B2
(45) Date of Patent: Oct. 15, 2019

(54) METHOD FOR USER COOPERATION-BASED BEAM SCANNING FOR HYBRID BEAMFORMING IN WIRELESS COMMUNICATION SYSTEM, AND APPARATUS THEREFOR

(71) Applicant: LG ELECTRONICS INC., Seoul (KR)

(72) Inventors: Heejin Kim, Seoul (KR); Jiwon Kang, Seoul (KR); Kilbom Lee, Seoul (KR); Kitae Kim, Seoul (KR); Kungmin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/755,895

(22) PCT Filed: Jul. 4, 2016

(86) PCT No.: PCT/KR2016/007175
§ 371 (c)(1),
(2) Date: Feb. 27, 2018

(87) PCT Pub. No.: WO2017/039135
PCT Pub. Date: Mar. 9, 2017

(65) Prior Publication Data
US 2019/0036659 A1 Jan. 31, 2019

Related U.S. Application Data

(60) Provisional application No. 62/211,006, filed on Aug. 28, 2015.

(51) Int. Cl.
*H04L 5/00* (2006.01)
*H04B 7/06* (2006.01)
(Continued)

(52) U.S. Cl.
CPC .......... *H04L 5/0032* (2013.01); *H04B 7/046* (2013.01); *H04B 7/0408* (2013.01);
(Continued)

(58) Field of Classification Search
CPC ... H04B 7/0695; H04B 7/0452; H04L 5/0032; H04W 72/02
See application file for complete search history.

(56) References Cited

U.S. PATENT DOCUMENTS 9,788,240 B2 * 10/2017 Kulal ..................... H04W 24/02
2013/0057432 A1 * 3/2013 Rajagopal ................ H01Q 3/26
342/368
(Continued)

FOREIGN PATENT DOCUMENTS

EP 2882110 6/2015
WO 2015020404 2/2015
(Continued)

OTHER PUBLICATIONS

PCT International Application No. PCT/KR2016/007175, Written Opinion of the International Searching Authority dated Sep. 12, 2016, 18 pages.

*Primary Examiner* — Robert C Scheibel
(74) *Attorney, Agent, or Firm* — Lee Hong Degerman Kang & Waimey

(57) ABSTRACT

The present application discloses a method for transmitting, at a transmitting end, a signal to a receiving end in a wireless communication system. Specifically, the method for transmitting a signal comprises the steps of: receiving preferred beam identifier information from a representative receiving end of a plurality of receiving ends comprising the receiving end; configuring, on the basis of the preferred beam identifier information, a first precoder for aiming the direction of the signal in a first beam direction and a second precoder for aiming the direction of the signal in the direction of the
(Continued)

receiving end with respect to the first beam direction; and transmitting the signal to the receiving end using a hybrid beamformer comprised of the first precoder and the second precoder.

10 Claims, 11 Drawing Sheets

(51) Int. Cl.
    *H04B 7/0408*     (2017.01)
    *H04W 72/02*     (2009.01)
    *H04B 7/0417*     (2017.01)
    *H04B 7/0456*     (2017.01)
    *H04B 7/08*     (2006.01)

(52) U.S. Cl.
    CPC ......... *H04B 7/0417* (2013.01); *H04B 7/0695* (2013.01); *H04L 5/0026* (2013.01); *H04W 72/02* (2013.01); *H04B 7/0686* (2013.01); *H04B 7/0697* (2013.01); *H04B 7/0868* (2013.01); *H04L 5/0037* (2013.01)

(56) References Cited

U.S. PATENT DOCUMENTS

| 2013/0301454 | A1* | 11/2013 | Seol | H04B 7/043 |
| | | | | 370/252 |
| 2013/0343303 | A1* | 12/2013 | Kim | H04B 7/0452 |
| | | | | 370/329 |
| 2016/0021549 | A1* | 1/2016 | Subramanian | H04W 16/28 |
| | | | | 370/329 |
| 2016/0226640 | A1* | 8/2016 | Seol | H04B 7/26 |
| 2017/0222699 | A1* | 8/2017 | Scherb | H04B 7/0456 |

FOREIGN PATENT DOCUMENTS

| WO | 2015065157 | 5/2015 |
| WO | 2015080471 | 6/2015 |
| WO | 2015111767 | 7/2015 |

* cited by examiner

METHOD FOR USER COOPERATION-BASED BEAM SCANNING FOR HYBRID BEAMFORMING IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2016/007175, filed on Jul. 4, 2016, which claims the benefit of U.S. Provisional Application No. 62/211,006, filed on Aug. 28, 2015, the contents of which are all hereby incorporated by reference herein in their entirety.

TECHNICAL FIELD

The present disclosure relates to a wireless communication system, and more particularly, to a method and apparatus for performing user cooperation-based beam scanning for hybrid beamforming in a wireless communication system.

BACKGROUND ART

A legacy beamforming technique using multiple antennas can be mainly classified into an analog beamforming technique and a digital beamforming technique depending on a location to which a beamforming weight vector/precoding vector is applied.

First of all, the analog beamforming technique is a typical beamforming technique applied to an initial multi-antenna structure. The analog beamforming technique divides an analog signal of which digital signal processing is completed into a plurality of paths and sets phase-shift (PS) and power amplification (PA) to each of a plurality of the paths to perform beamforming. FIG. 1 is a diagram for an example of a legacy analog beamforming technique.

Referring to FIG. 1, it is able to see a structure that an analog signal derived from a single digital signal is processed by a power amplifier and a phase shifter connected to each antenna to perform analog beamforming. In particular, the phase shifter and the power amplifier process complex weights at an analog stage. In this case, a radio frequency (RF) chain corresponds to a processing block in which a single digital signal is converted into an analog signal.

However, according to the analog beamforming technique, since accuracy of a beam is determined according to characteristics of elements of the phase shifter and the power amplifier, the analog beamforming technique is advantageous for the narrow band transmission due to the control characteristics of the elements. On the other hand, since the analog beamforming technique has a hardware structure incapable of implementing multi-stream transmission, multiplexing gain for increasing a transmission rate is relatively small and it is difficult to perform beamforming per user based on orthogonal resource allocation.

Unlike the analog beamforming technique, the digital beamforming technique performs beamforming at a digital stage using a baseband process to maximize diversity and multiplexing gain in MIMO environment. FIG. 2 is an exemplary view illustrating a legacy digital beamforming scheme.

Referring to FIG. 2, digital beamforming can be performed by performing precoding in a baseband process. Unlike FIG. 1, an RF chain includes a power amplifier. This is because a complex weight derived for beamforming is directly applied to a transmission data.

And, since the digital beamforming technique is able to differently perform beamforming according to a user, it is able to support multi user beamforming at the same time. Since the digital beamforming technique is able to perform independent beamforming according to a user to which an orthogonal resource is allocated, the digital beamforming technique has characteristics that scheduling flexibility is high and it is able to manage a transmitting end in accordance with a system purpose. Moreover, when a technique such as multiple-input multiple-output (MIMO)-orthogonal frequency division multiplexing (OFDM) is applied in a broadband transmission environment, it may form an independent beam for each subcarrier. Therefore, the digital beamforming technique can maximize the maximum transmission rate of a single user based on increased system capacity and enhanced beam gain.

In accordance with the aforementioned advantages and disadvantages, digital beamforming-based MIMO technology has been introduced in the current 3G/4G system.

DISCLOSURE

Technical Problem

An aspect of the present disclosure devised to solve the conventional problem is to provide a method and apparatus for performing user cooperation-based beam scanning for hybrid beamforming in a wireless communication system.

Technical Solution

In an aspect of the present disclosure, a method for transmitting a signal to a receiving end by a transmitting end in a wireless communication system includes receiving preferred beam identifier (ID) information from a representative receiving end among a plurality of receiving ends including the receiving end, configuring, based on the preferred beam ID information, a first precoder for steering the signal in a first beam direction, and a second precoder for steering the signal in a direction of the receiving end, and transmitting the signal to the receiving end by a hybrid beamformer including the first precoder and the second precoder. Herein, only the representative receiving end among the plurality of receiving ends performs beam scanning to generate the preferred beam ID information.

Preferably, the method may further include selecting the representative receiving end from among the plurality of receiving ends, and transmitting information about the representative receiving end to the plurality of receiving ends.

Additionally, the method may further include transmitting the preferred beam ID information to remaining receiving ends except for the representative receiving end among the plurality of receiving ends. However, remaining receiving ends except for the representative receiving end among the plurality of receiving ends may receive the preferred beam ID information from the representative receiving end.

More preferably, the method may further include receiving feedback information for the second precoder from the receiving end.

In another aspect of the present disclosure, a transmission apparatus for transmitting a signal to a reception apparatus in a wireless communication system includes a wireless communication module, and a processor for processing the signal. The processor is configured to control the wireless communication module to receive preferred beam ID information from a representative reception apparatus among a plurality of reception apparatuses including the reception apparatus, to configure, based on the preferred beam ID information, a first precoder for steering the signal in a first beam direction, and a second precoder for steering the signal in a direction of the reception apparatus, and to control the wireless communication module to transmit the signal to the reception apparatus by a hybrid beamformer including the first precoder and the second precoder. Herein, only the representative reception apparatus among the plurality of reception apparatuses performs beam scanning to generate the preferred beam ID information.

Preferably, the processor may be configured to select the representative reception apparatus from among the plurality of reception apparatuses, and to control the wireless communication module to transmit information about the representative reception apparatus to the plurality of reception apparatuses.

Further, the processor may be configured to control the wireless communication module to transmit the preferred beam ID information to remaining reception apparatuses except for the representative reception apparatus among the plurality of reception apparatuses. However, remaining reception apparatuses except for the representative reception apparatus among the plurality of reception apparatuses may receive the preferred beam ID information from the representative reception apparatus.

More preferably, the processor may be configured to control the wireless communication module to receive feedback information for the second precoder from the reception apparatus.

Advantageous Effects

According to the embodiments of the present disclosure, signal transmission and reception optimized for a wireless channel situation may be performed using a hybrid beamforming scheme. Particularly, user cooperation-based beam scanning for hybrid beamforming may be performed efficiently.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BEST MODE FOR CARRYING OUT THE INVENTION

The configuration, operation and other features of the present invention will be understood by the embodiments of the present invention described with reference to the accompanying drawings.

Hereinafter, a multiple-input multiple-output (MIMO) system will be described. In the MIMO system, multiple transmission antennas and multiple reception antennas are used. By this method, data transmission/reception efficiency can be improved. That is, since a plurality of antennas is used in a transmitter or a receiver of a wireless communication system, capacity can be increased and performance can be improved. Hereinafter, MIMO may also be called "multi-antenna".

In the multi-antenna technique, a single antenna path is not used for receiving one message. Instead, in the multi-antenna technique, data fragments received via several antennas are collected and combined so as to complete data. If the multi-antenna technique is used, a data transfer rate may be improved within a cell region having a specific size or system coverage may be increased while ensuring a specific data transfer rate. In addition, this technique may be widely used in a mobile communication terminal, a repeater and the like. According to the multi-antenna technique, it is possible to overcome a limit in transmission amount of conventional mobile communication using a single antenna.

Figure 1:
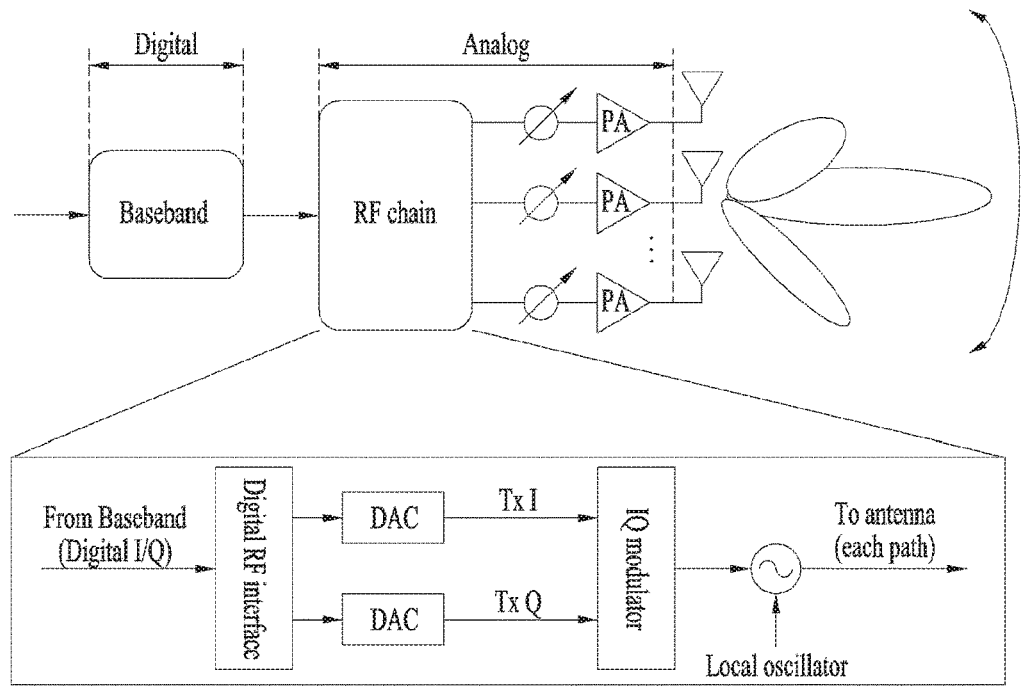
FIG. 1 is a diagram for an example of a legacy analog beamforming technique.
Figure 2:
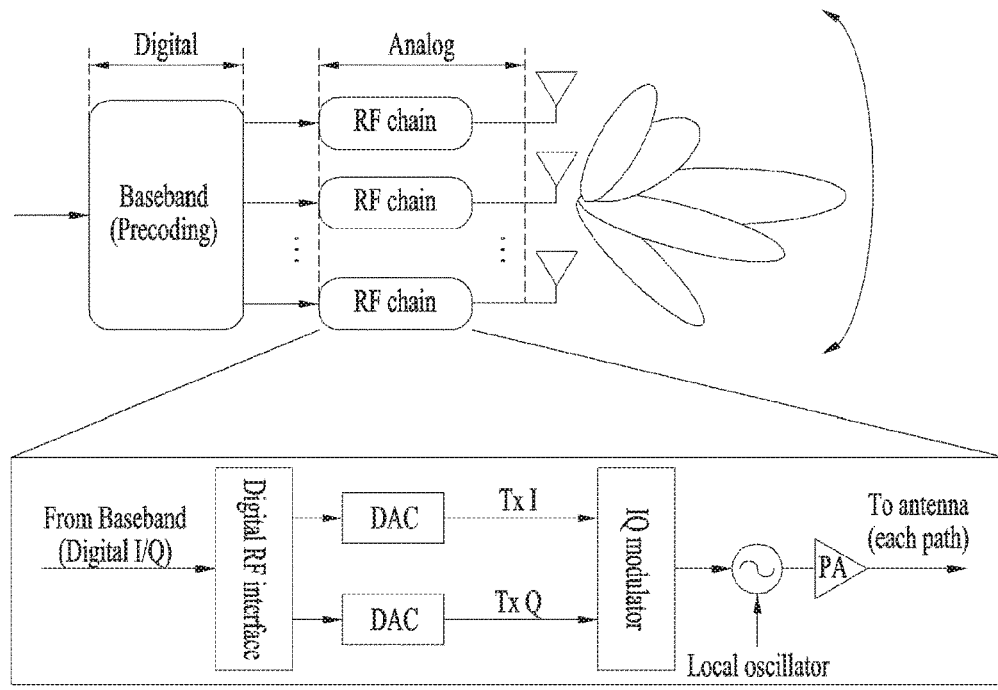
FIG. 2 is a diagram for an example of a legacy digital beamforming technique.
Figure 3:
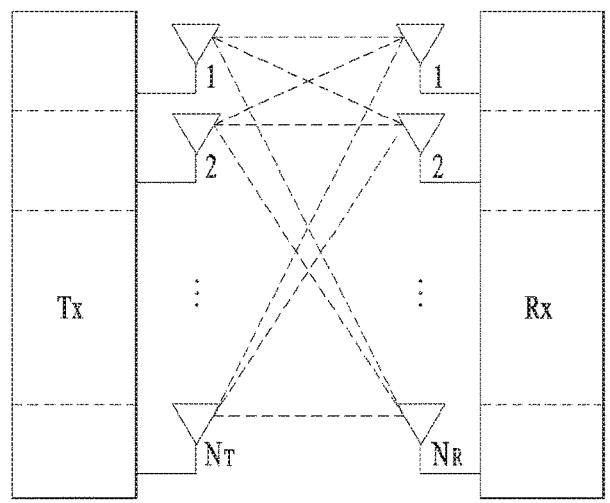
FIG. 3 is a diagram showing the configuration of a general multiple input multiple output (MIMO) system.

The configuration of the general multi-antenna (MIMO) communication system is shown in FIG. 3. $N_T$ transmission antennas are provided in a transmitter and $N_R$ reception antennas are provided in a receiver. If the multiple antennas are used in both the transmitter and the receiver, theoretical channel transmission capacity is increased as compared with the case where multiple antennas are used in only one of the transmitter or the receiver. The increase in the channel transmission capacity is proportional to the number of antennas. Accordingly, transfer rate is improved and frequency efficiency is improved. If a maximum transfer rate in the case where one antenna is used is $R_o$, a transfer rate in the case where multiple antennas are used can be theoretically increased by a value obtained by multiplying $R_o$ by a rate increase ratio $R_i$ as shown in Equation 1 below. Here, $R_i$ is the smaller of the two values $N_T$ and $N_R$.

$$R_i = \min(N_T, N_R) \quad \text{[Equation 1]}$$

For example, in a MIMO system using four transmit antennas and four reception antennas, it is possible to theoretically acquire a transfer rate which is four times that of a single antenna system. After the theoretical increase in the capacity of the MIMO system was proved in the mid-1990s, various technologies of substantially improving a data transmission rate have been actively developed up to now. In addition, several technologies are already applied to the various radio communication standards such as the third-generation mobile communication and the next-generation wireless local area network (LAN).

According to the researches into the MIMO antenna up to now, various researches such as researches into information theory related to the computation of the communication capacity of a MIMO antenna in various channel environments and multiple access environments, researches into the model and the measurement of the radio channels of the MIMO system, and researches into space-time signal processing technologies of improving transmission reliability and transmission rate have been actively conducted.

The communication method of the MIMO system will be described in more detail using mathematical modeling. As shown in FIG. 3, it is assumed that $N_T$ transmit antennas and $N_R$ reception antennas are present. In transmitted signals, if the $N_T$ transmit antennas are present, the number of pieces of maximally transmittable information is $N_T$. The transmitted information may be expressed by a vector shown in Equation 2 below.

$$s = [s_1, s_2, \ldots, s_{N_T}]^T \quad \text{[Equation 2]}$$

The transmitted information $s_1, s_2, \ldots, s_{N_T}$ may have different transmit powers. If the respective transmit powers are $P_1, P_2, \ldots, P_{N_T}$, the transmitted information with adjusted powers may be expressed by a vector shown in Equation 3 below.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{S}$ may be expressed using a diagonal matrix P of the transmit powers as shown in Equation 4 below.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Considers that the $N_T$ actually transmitted signals $x_1, x_2, \ldots, x_{N_T}$ are configured by applying a weight matrix W to the information vector $\hat{S}$ with the adjusted transmit powers. The weight matrix serves to appropriately distribute the transmitted information to each antenna according to a transport channel state, etc. Such transmitted signals $x_1, x_2, \ldots, x_{N_T}$ may be expressed by using a vector X as shown in Equation 5 below. $W_{ij}$ denotes a weight between an i-th transmit antenna and j-th information. W is also called a weight matrix or a precoding matrix.

$$x = \quad \text{[Equation 5]}$$

$$\begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$

In general, the physical meaning of the rank of the channel matrix may be a maximum number of elements capable of transmitting different information via a given channel. Accordingly, since the rank of the channel matrix is defined as the smaller of the number of independent rows or columns, the rank of the matrix is not greater than the number of rows or columns. The rank rank(H) of the channel matrix H is mathematically expressed by Equation 6.

$$\text{rank}(H) \leq \min(N_T, N_R) \quad \text{[Equation 6]}$$

In addition, different information transmitted using the MIMO technology is defined as "transmitted stream" or "stream". Such "stream" may be referred to as "layer". Then, the number of transmitted streams is not greater than the rank which is a maximum number capable of transmitting different information. Accordingly, the channel rank H is expressed by Equation 7 below.

$$\text{\# of streams} \leq \text{rank}(H) \leq \min(N_T, N_R) \quad \text{[Equation 7]}$$

where, "# of streams" denotes the number of streams. It should be noted that one stream may be transmitted via one or more antennas.

There are various methods for associating one or more streams with several antennas. These methods will be described according to the kind of the MIMO technology. A method of transmitting one stream via several antennas is referred to as a spatial diversity method and a method of transmitting several streams via several antennas is referred to as a spatial multiplexing method. In addition, a hybrid method which is a combination of the spatial diversity method and the spatial multiplexing method may be used.

In the following, a massive MIMO environment in which the number of transmission and reception antennas is considerably increased is explained. In general, in cellular communication, it is assumed that maximum 8 transmission/reception antennas are applied to a MIMO environment. However, as evolving into massive MIMO, the number of antennas may increase more than dozens or several hundreds of antennas.

If a digital beamforming technique is applied in a massive MIMO environment, since it is necessary to perform signal processing on hundreds of antennas for digital signal processing of a transmitting end through a baseband process, signal processing complexity becomes very complex and hardware implementation complexity becomes very complex because RF chains as many as the number of antennas are necessary. In addition, since it is necessary to perform independent channel estimation on all antennas and have feedback information on a huge MIMO channel consisting of all antennas in case of a FDD (frequency division duplex) system, a pilot and a feedback overhead become very big. On the other hand, if an analog beamforming technique is applied in the massive MIMO environment, hardware complexity of a transmitting end is relatively low, but performance enhancement using multiple antennas is insignificant and flexibility of resource allocation is degraded. In particular, in case of performing broadband transmission, it is very difficult to control a beam according to a frequency.

Therefore, in the massive MIMO environment, it is necessary to have a scheme of configuring a transmitting end of a hybrid type that an analog beamforming structure and a digital beamforming structure are combined instead of exclusively selecting one of the analog beamforming and the digital beamforming techniques Table 1 in the following shows relationship between a performance gain and complexity of the analog beamforming technique and the digital beamforming technique. It is necessary to design a structure of a transmitting end of a hybrid type capable of reducing the hardware implementation complexity of the transmitting end and maximizing a beamforming gain using the massive antenna based on the relationship.

analog beamforming technique performs same beamforming on the entire transmission band. Hence, it is difficult to perform independent beamforming according to a user or a stream. In particular, since it is difficult to support FDMA (e.g., OFDMA) through orthogonal frequency resource allocation, it may be difficult to achieve optimization of frequency resource efficiency.

TABLE 1

| | Easy of beamforming accuracy control | Multi-carrier beam control | Multi-stream transmission | Hardware complexity (BB process) | Pilot and feedback overhead |
|---|---|---|---|---|---|
| Analog beamforming technique | low | impossible or difficult | impossible or difficult | low | low |
| Digital beamforming technique | high | possible | possible | high | high |

In the following, hybrid beamforming is explained in more detail.

Figure 4:
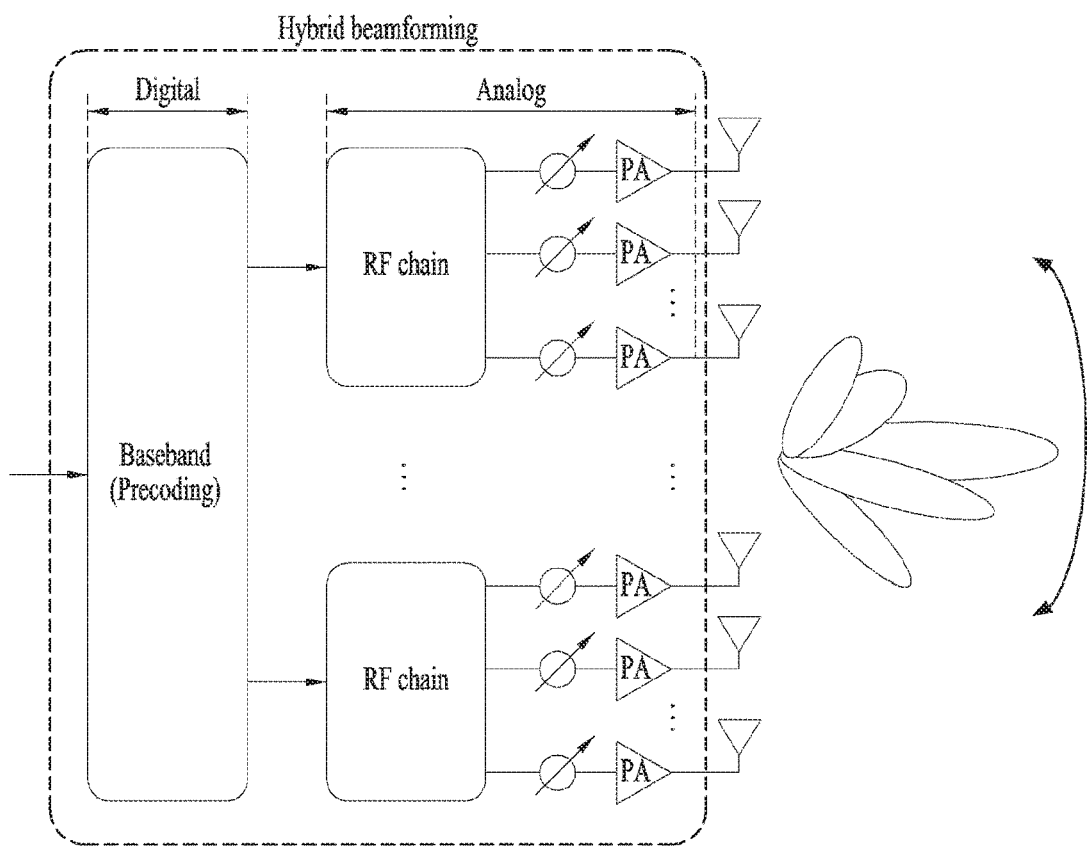
FIG. 4 is a diagram for explaining a concept of hybrid beamforming.

The hybrid beamforming is performed to configure a transmitting end capable of reducing hardware complexity and achieving characteristics of the analog beamforming technique and advantages of the digital beamforming technique. FIG. 4 is a diagram for explaining a concept of hybrid beamforming.

Referring to FIG. 4, the hybrid beamforming is a structure that performs coarse beamforming using the analog beamforming technique and performs multi-stream or multi-user transmission using the digital beamforming technique. Consequently, the hybrid beamforming has a structure for simultaneously performing the analog beamforming technique and the digital beamforming technique to lower implementation complexity of a transmitting end or hardware complexity. Basically, technical issues of the hybrid beamforming are described in the following.

Optimization considering both analog and digital beamforming at the same time has the following difficulties. Basically, the digital beamforming has an identical time-frequency resource and can apply an independent beamforming technique to each user. On the contrary, the analog beamforming has a limitation that it is necessary to apply a common beamforming technique with an identical time-frequency resource. Hence, the limitation causes such an optimization constraint as the number of supported ranks, beam control flexibility, beamforming decomposition, and the like.

The analog beamforming technique, which forms a beam only in a specific direction in the same time-frequency resource, is unable to perform multiple beamforming in all UEs directions at the same time. Hence, there is a problem that it is impossible to simultaneously transmit a UL/DL control channel, a reference signal, a synchronization signal, and the like to all UEs capable of being distributed to all areas of a cell.

In case of performing estimation on an analog/digital beam, although the digital beam is able to use a legacy orthogonal pilot allocation scheme as it is, the analog beam requires a predetermined time-duration as many as the number of beam candidates. This means that time delay required for the analog beam estimation is not small. And, if the analog beam and the digital beam are estimated at the same time, complexity can be considerably increased.

Lastly, while the digital beamforming technique is able to easily perform beamforming for multi-user/stream, the Among the aforementioned technical issues, an object of the present invention is to provide a method capable of solving analog/digital beam estimation complexity for hybrid beamforming.

Figure 5:
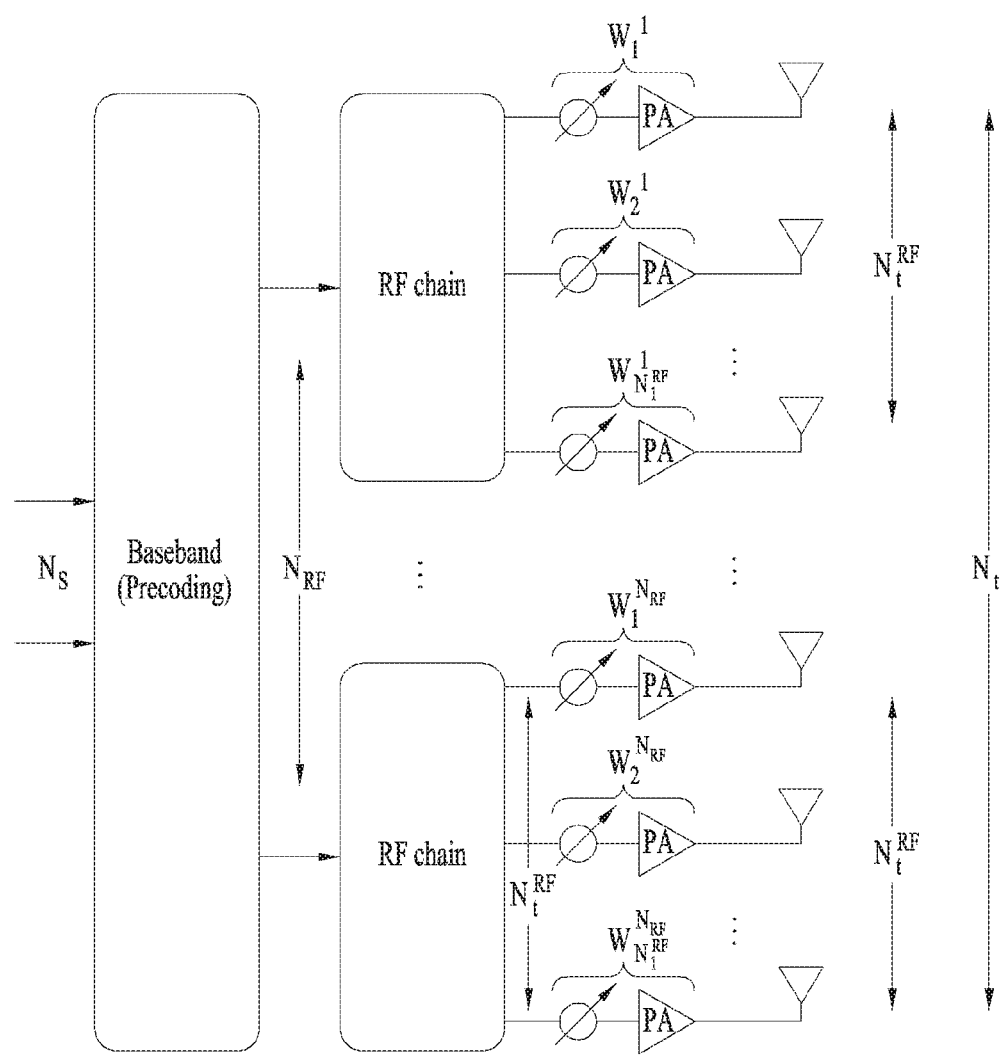
FIG. 5 is a diagram for a structure of a transmitting end that performs hybrid beamforming.

FIG. 5 is a diagram for a structure of a transmitting end that performs hybrid beamforming. In particular, in FIG. 5, assume that the transmitting end performing hybrid beamforming is equipped with $N_t^{RF}$ number of independent antennas only according to an RF chain.

In this case, such a relationship as $N_t = N_t^{RF} \times N_{RF}$ is established between the number of all antennas and the number of antennas according to an RF chain. Since a signal, which has passed a phase shifter and a power amplifier, is independently transmitted to a transmission antenna at the end, it may assume such a system model as equation 8 in the following.

$$y_k = H_k F_k^{RF} F_k^{BB} s_k + z_k \qquad \text{[Equation 8]}$$

In equation 8, $y_k$ corresponds to a reception signal vector ($N_r \times 1$) on a subcarrier where an index corresponds to k, $H_k$ corresponds to a $N_r \times N_t$ channel matrix on a subcarrier where an index corresponds to k, $F^{RF}$ corresponds to an RF precoder having a size of $N_t \times N_t$ on all subcarriers, and the RF precoder is identically applied to all subcarriers. Moreover, $F_k^{BB}$ corresponds to a baseband precoder having a size of $N_{RF} \times N_S$ on a subcarrier where an index corresponds to k and the baseband precoder can be changed according to a subcarrier. In addition, $s_k$ corresponds to a transmission signal vector ($N_S \times 1$) on a subcarrier where an index corresponds to k and $z_k$ corresponds to a noise signal vector ($N_r \times 1$) on a subcarrier where an index corresponds to k.

And, the subcarrier index k has values ranging from 0 to $N_{FFT} - 1$. In this case, the $N_{FFT}$ is a FFT (Fast Fourier Transform) size and corresponds to the number of total subcarriers. And, $N_{RF}$ indicates the number of total RF chains, $N_t$ indicates the number of total antennas of a transmitting end, and $N_t^{RF}$ corresponds to the number of transmission antennas installed according to an RF chain. Lastly, $N_r$ indicates the number of total antennas of a receiving end and $N_s$ indicates the number of transmission data streams.

Meanwhile, if the equation 8 is developed for a subcarrier k, it can be represented as equation 9 in the following.

$$\begin{bmatrix} y^{(1)} \\ M \\ y^{(Nr)} \end{bmatrix} = \begin{bmatrix} h_{11} & h_{12} & \Lambda & h_{1Nt} \\ h_{21} & h_{22} & \Lambda & h_{2Nt} \\ M & M & O & M \\ h_{Nr1} & h_{Nr2} & \Lambda & h_{NrNt} \end{bmatrix} F^{RF} \qquad \text{[Equation 9]}$$

$$\left( \begin{bmatrix} v_{1,1} & v_{1,2} & \Lambda & v_{N_{RF},N_S} \\ v_{2,1} & v_{2,2} & \Lambda & v_{N_{RF},N_S} \\ M & M & O & M \\ v_{N_{RF},1} & v_{N_{RF},2} & \Lambda & v_{N_{RF},N_S} \end{bmatrix} \begin{bmatrix} x^{(1)} \\ M \\ x^{(N_S-1)} \end{bmatrix} \right) + \begin{bmatrix} z^{(1)} \\ M \\ z^{(Nr)} \end{bmatrix}$$

In this case, an equivalent precoding matrix $F^{RF}$ ($N_t \times N_{RF}$) of analog beamforming formed by a phase shifter and a power amplifier after an RF chain can be represented as equation 10 in the following.

$$F^{RF} = \begin{bmatrix} w^1_{N^{RF}_t} & 0 & 0 & \Lambda & 0 \\ 0 & w^2_{N^{RF}_t} & 0 & \Lambda & 0 \\ 0 & 0 & w^3_{N^{RF}_t} & \Lambda & 0 \\ M & M & M & O & M \\ 0 & 0 & 0 & \Lambda & w^{N_{RF}}_{N^{RF}_t} \end{bmatrix} \qquad \text{[Equation 10]}$$

And, a weight per RF chain of an RF precoder $F^{RF}$ can be represented as equation 11 in the following.

$$w^j_{N^{RF}_t} = \begin{bmatrix} w^j_1 \\ w^j_2 \\ M \\ w^j_{N^{RF}_t} \end{bmatrix} \qquad \text{[Equation 11]}$$

In the following, a beam radiation pattern of hybrid beamforming for a ULA (uniform linear array) antenna is explained. An array response vector of the ULA antenna can be represented as equation 12 in the following.

$$a(\theta) = \begin{bmatrix} 1 & \exp\left(j2\pi \times 1 \times \frac{d}{\lambda}\sin(\theta)\right) & \exp\left(j2\pi \times 2 \times \frac{d}{\lambda}\sin(\theta)\right) \\ & \Lambda & \exp\left(j2\pi \times (N_t - 1) \times \frac{d}{\lambda}\sin(\theta)\right) \end{bmatrix}^T \qquad \text{[Equation 12]}$$

In equation 12, $\lambda$ corresponds to a wave-length and d indicates a distance between antennas. In order to represent an antenna radiation pattern of a hybrid beamformer, for clarity, assume that the number of RF chains corresponds to 4 and the number of analog antennas per RF chain corresponds to 4.

Figure 6:
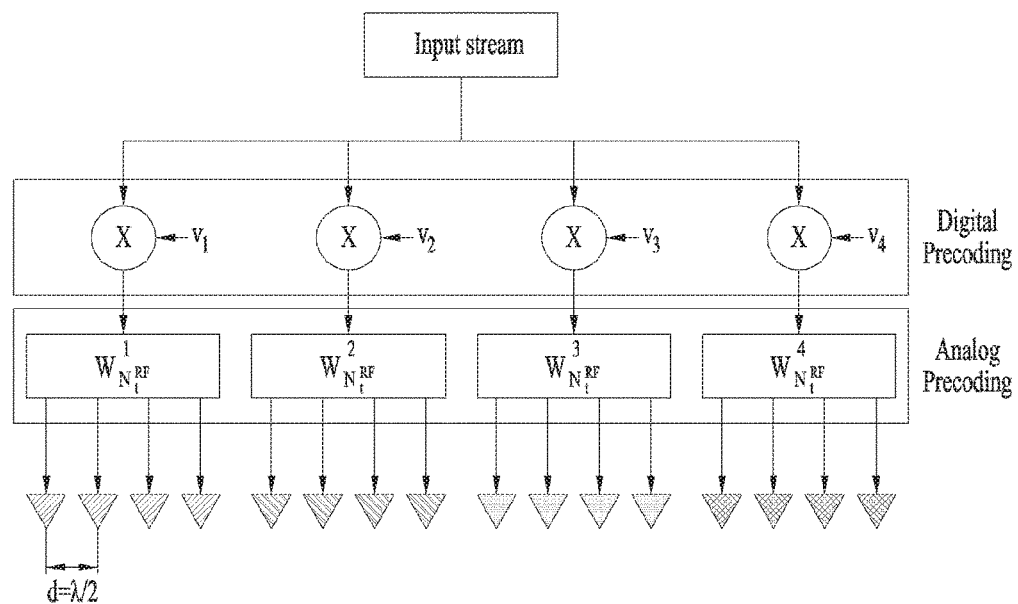
FIG. 6 is a diagram for 16 ULA antenna structure consisting of 4 RF chains.

FIG. 6 is a diagram for 16 ULA antenna structure consisting of 4 RF chains. In particular, in FIG. 6, the total number of transmission antennas corresponds to 16 and it becomes $d=\lambda/2$. A phase shifter and a power amplifier of an analog terminal can be represented by a beamforming weight, i.e., a precoder. The precoder can be represented as equation 13 in the following.

$$F^{RF} = \begin{bmatrix} w^1_{N^{RF}_t} & 0 & 0 & 0 \\ 0 & w^2_{N^{RF}_t} & 0 & 0 \\ 0 & 0 & w^3_{N^{RF}_t} & 0 \\ 0 & 0 & 0 & w^4_{N^{RF}_t} \end{bmatrix}, w^j_{N^{RF}_t} = \begin{bmatrix} w^j_1 \\ w^j_2 \\ w^j_3 \\ w^j_4 \end{bmatrix} \qquad \text{[Equation 13]}$$

In order to derive a beam pattern from a direction of a main lobe center of a radio wave radiated from an antenna, i.e., boresight, a beam shift angle is set to $0°$. Hence, all weight vectors of an analog precoding matrix have an element of a value of 1. In this case, a rank 1 weight vector to be randomly applied in a digital beamforming stage is defined as equation 14 in the following.

$$F^{BB} = v_1 = [v_1 v_2 v_3 v_4]^T \qquad \text{[Equation 14]}$$

In the boresight ($\theta = 0°$), all antenna array response vectors to which digital beamforming of equation 13 is applied can be represented as equation 15. In this case, a distance d between antennas is assumed as $\lambda/2$.

$$\Sigma a(\theta) = \qquad \text{[Equation 15]}$$
$$\sum_{i=0}^{15} a_i(\theta) = (1 + \exp(j\pi \times \sin(\theta)) + \exp(j\pi 2 \times \sin(\theta)) +$$
$$\exp(j\pi 3 \times \sin(\theta))) \times v_1 +$$
$$(1 + \exp(j\pi 4 \times \sin(\theta)) + \exp(j\pi 5 \times \sin(\theta)) +$$
$$\exp(j\pi 6 \times \sin(\theta)) + \exp(j\pi 7 \times \sin(\theta))) \times v_2 +$$
$$(1 + \exp(j\pi 8 \times \sin(\theta)) + \exp(j\pi 9 \times \sin(\theta)) +$$
$$\exp(j\pi 10 \times \sin(\theta)) + \exp(j\pi 11 \times \sin(\theta))) \times v_3 +$$
$$(1 + \exp(j\pi 12 \times \sin(\theta)) + \exp(j\pi 13 \times \sin(\theta)) +$$
$$\exp(j\pi 14 \times \sin(\theta)) + \exp(j\pi 15 \times \sin(\theta))) \times v_4$$

Herein, analog beamforming weights may be configured by [Equation 16] below. This is a general analog beamforming weight configuration method used to set a boresight for analog beamforming.

$$w^1_1 = \begin{bmatrix} 1 \\ e^{-j\pi 2\sin(\phi)} \\ e^{-j\pi 2\sin(\phi)} \\ e^{-j\pi 3\sin(\phi)} \end{bmatrix}, w^1_2 = \begin{bmatrix} e^{-j\pi 4\sin(\phi)} \\ e^{-j\pi 5\sin(\phi)} \\ e^{-j\pi 6\sin(\phi)} \\ e^{-j\pi 7\sin(\phi)} \end{bmatrix} = e^{j\pi 4\sin(\theta)} \begin{bmatrix} 1 \\ e^{-j\pi \sin(\phi)} \\ e^{-j\pi 2\sin(\phi)} \\ e^{-j\pi 3\sin(\phi)} \end{bmatrix}, \qquad \text{[Equation 16]}$$

$$w^1_3 = \begin{bmatrix} e^{-j\pi 8\sin(\phi)} \\ e^{-j\pi 9\sin(\phi)} \\ e^{-j\pi 10\sin(\phi)} \\ e^{-j\pi 11\sin(\varphi)} \end{bmatrix} = e^{j\pi 8\sin(\theta)} \begin{bmatrix} 1 \\ e^{-j\pi \sin(\phi)} \\ e^{-j\pi 2\sin(\phi)} \\ e^{-j\pi 3\sin(\phi)} \end{bmatrix},$$

$$w^1_4 = \begin{bmatrix} e^{-j\pi 12\sin(\phi)} \\ e^{-j\pi 13\sin(\phi)} \\ e^{-j\pi 14\sin(\phi)} \\ e^{-j\pi 15\sin(\phi)} \end{bmatrix} = e^{j\pi 12\sin(\theta)} \begin{bmatrix} 1 \\ e^{-j\pi \sin(\phi)} \\ e^{-j\pi 2\sin(\phi)} \\ e^{-j\pi 3\sin(\phi)} \end{bmatrix}$$

[Equation 15] may be simplified to [Equation 17] by using [Equation 16].

$$\Sigma a(\theta) = (1 + \exp(j\pi[\sin(\theta) - \sin(\phi)]) + \exp(j\pi 2[\sin(\theta) - \sin(\phi)]) + \exp(j\pi 3[\sin(\theta) - \sin(\phi)])) \times (v_1 + \exp(j\pi 4[\sin(\theta) - \sin(\phi)]) \cdot v_2 + \exp(j\pi 8[\sin(\theta) - \sin(\phi)]) \cdot v_3 + \exp(j\pi 12[\sin(\theta) - \sin(\phi)]) \cdot v_4)$$ [Equation 17]

[Equation 17] may be expressed as [Equation 18].

$$\begin{aligned}\Sigma a(\theta) =\ & (1 + \exp(j\pi[\sin(\theta) - \sin(\phi)]) + \ldots + \\ & \exp(j\pi(N_t^{RF} - 1) \cdot [\sin(\theta) - \sin(\phi)])) \times (v_1 + \\ & \exp(j\pi \cdot (N_t^{RF}) \cdot [\sin(\theta) - \sin(\phi)]) \cdot v_2 + \cdots + \exp(j\pi \cdot [N_t^{RF} \cdot (N_{RF} - 1)] \cdot \\ & [\sin(\theta) - \sin(\phi)]) \cdot v_{N_{RF}}) \\ =\ & \left(\sum_{i=1}^{N_t^{RF}} s_i\right) \times \left(\sum_{i=1}^{N_{RF}} t_i\right) = \sum s \times \sum t\end{aligned}$$ [Equation 18]

Herein, $\phi$ represents an angle (degrees) that determines analog beamforming. For example, if $\phi=30°$ or $\pi/6$, a beamforming direction with a maximum beam gain at $\theta=30°$ or $\pi/6$ is set. Further, a beam boundary vector s in [Equation 18] determines a total valid range. The range of digital beamforming is also limited to a corresponding region. Further, t represents a beam gain/adjustment vector.

Figure 9:
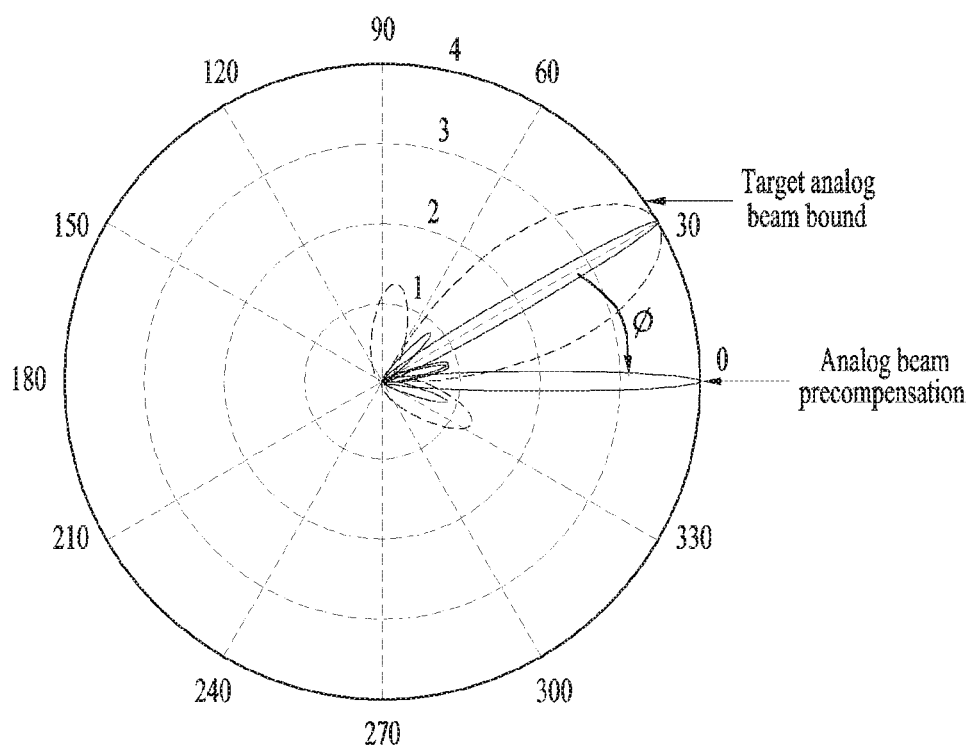
FIG. 9 is a view illustrating pre-compensation for analog beamforming in a hybrid beamforming process.

Referring to FIG. 9, accurate beamforming is possible by eliminating an analog beamforming setting value $\Phi$ through pre-compensation in digital beamforming. Accordingly, a base station (BS) determines a coefficient for analog beam pre-compensation in digital beamforming by using an inverted phase for an analog beam weight. The analog beam pre-compensation coefficient changes the direction of a digital beam to a 0-degree boresight irrespective of an analog beamforming angle, as illustrated in FIG. 9.

Figure 10:
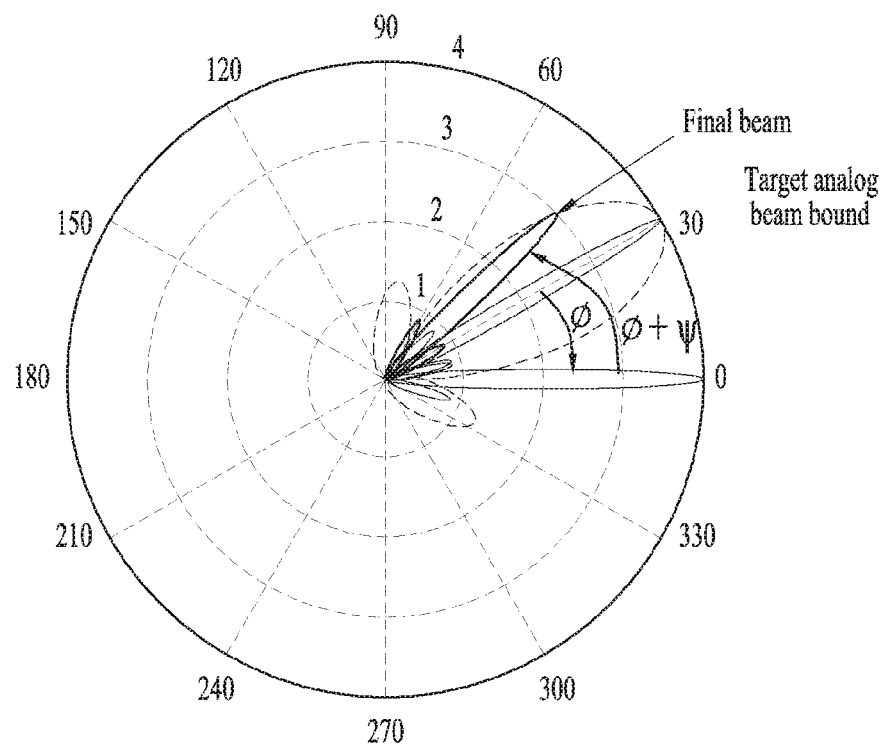
FIG. 10 is a view illustrating a final hybrid beam to which pre-compensation for analog beamforming is applied.

FIG. 10 illustrates a final hybrid beam to which pre-compensation for analog beamforming is applied. For a final beam setting value of a digital beamforming coefficient, a weight is set based on the direction of a final beam with respect to 0° irrespective of an analog beamforming setting value. This is done because the digital beamforming coefficient is a combination of two beamforming coefficients. That is, the analog beam pre-compensation means adjusting a beam to a 0° direction, as illustrated in FIG. 10. Therefore, a final target setting should be re-calculated eventually with respect to 0°. Accordingly, the direction of the final beam is set to $\phi+\psi$.

Based on the above description, actual digital beamforming coefficients may be designed by [Equation 19], relying on the digital precoder design principle for hybrid beamforming.

$$v = \begin{bmatrix} v_1 \\ v_2 \\ \vdots \\ v_{N_{RF}} \end{bmatrix} = \begin{bmatrix} 1 \\ e^{j\pi \cdot N_t^{RF} \cdot 1 \cdot (\sin(\phi) - \sin(\phi+\psi))} \\ \vdots \\ e^{j\pi \cdot N_t^{RF} \cdot (N_{RF}-1) \cdot (\sin(\phi) - \sin(\phi+\psi))} \end{bmatrix} = \begin{bmatrix} 1 \\ e^{j\pi \cdot N_t^{RF} \cdot 1 \cdot \sin(\phi)} e^{-j\pi \cdot N_t^{RF} \cdot 1 \cdot \sin(\phi+\psi)} \\ \vdots \\ e^{j\pi \cdot N_t^{RF} \cdot (N_{RF}-1)\sin(\phi)} e^{-j\pi \cdot N_t^{RF} \cdot (N_{RF}-1)\sin(\phi+\psi)} \end{bmatrix}$$

$$= \begin{bmatrix} 1 \\ e^{j\pi \cdot N_t^{RF} \cdot 1 \cdot \sin(\phi)} \\ \vdots \\ e^{j\pi \cdot N_t^{RF} \cdot (N_{RF}-1)\sin(\phi)} \end{bmatrix} \oplus \begin{bmatrix} 1 \\ e^{-j\pi \cdot N_t^{RF} \cdot 1 \cdot \sin(\phi+\psi)} \\ \vdots \\ e^{-j\pi \cdot N_t^{RF} \cdot (N_{RF}-1)\sin(\phi+\psi)} \end{bmatrix}$$ [Equation 19]

$\oplus$ : Hadamard product

Figure 7:
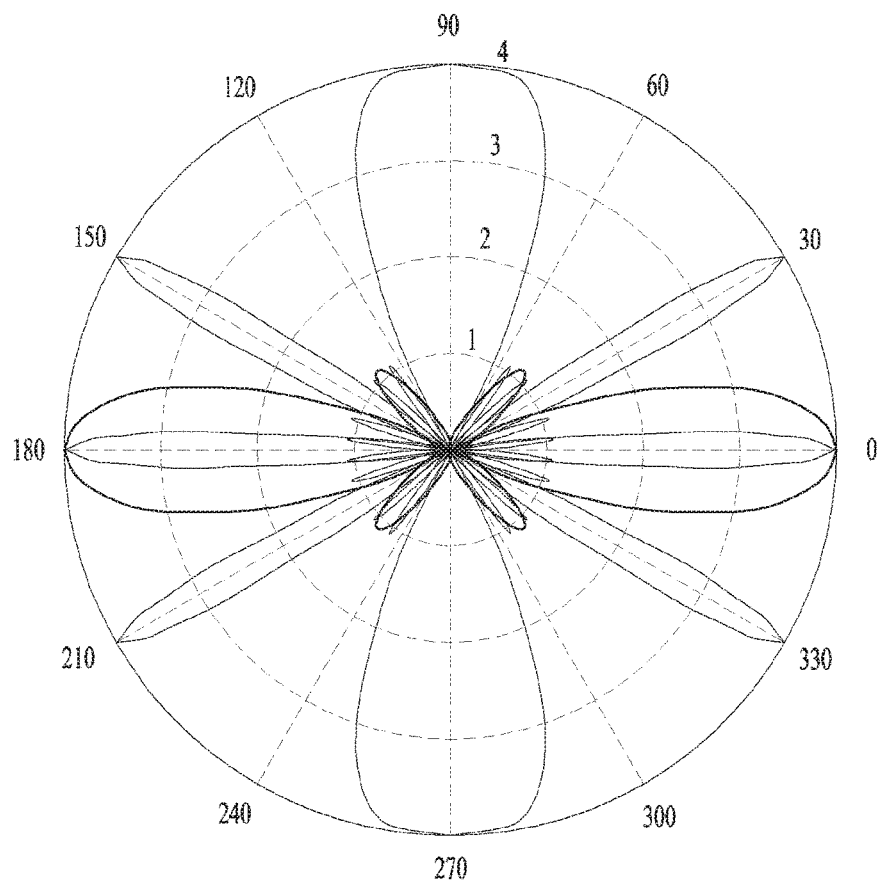
FIG. 7 is a diagram for beam patterns of a beam boundary vector and a beam coordination vector.
Figure 8:
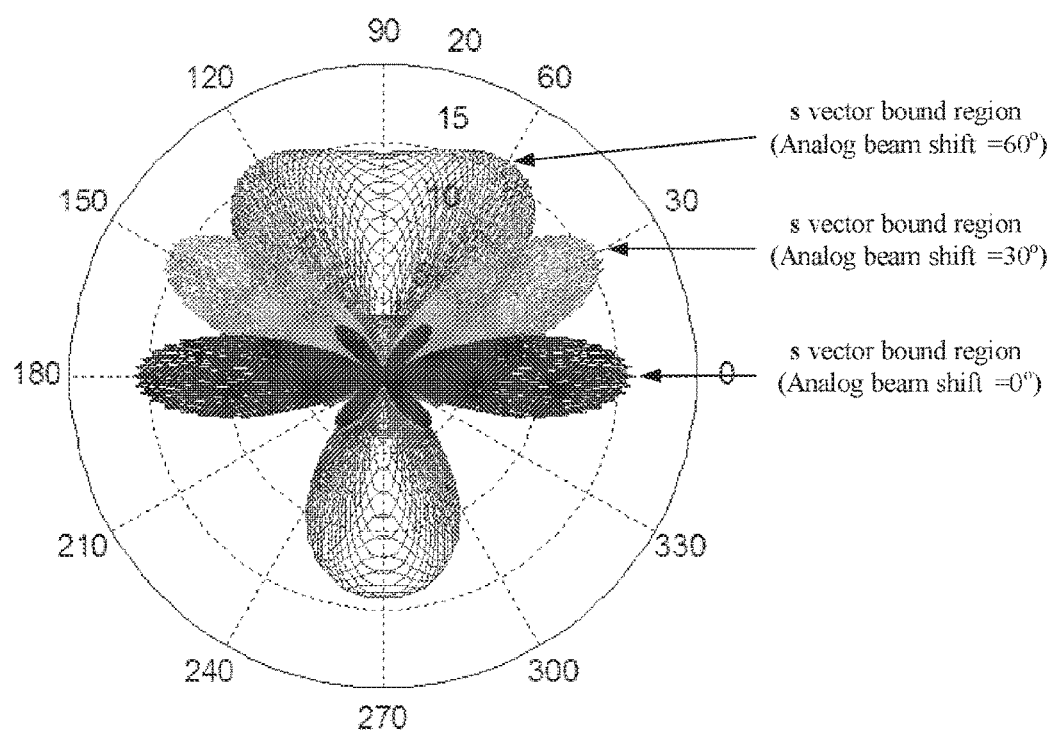
FIG. 8 is a diagram for a beam pattern of a final antenna array response vector according to analog beam shift.

FIG. 7 is a view illustrating beam patterns of a beam boundary vector and a beam coordination vector. Particularly, FIG. 7 assumes that $N_t=16$, $N_t^{RF}=4$, $N_{RF}=4$. A beam pattern of the beam boundary vector is denoted by a thick line and a beam pattern of the beam coordination vector is denoted by a thin line. FIG. 8 is a view illustrating a beam pattern of a final antenna array response vector according to analog beam shift. Similarly, it is assumed that $N_t=16$, $N_t^{RF}=4$, $N_{RF}=4$. In FIG. 8, an accumulated beam pattern result to which $v_1=[v_1\ v_2\ v_3\ v_4]^T$ for determining digital beamforming is applied is shown. Referring to FIGS. 7 and 8, it may be noted that the range of a valid beam is restricted by a beam boundary vector s.

Now, a description will be given of the principle of designing a digital precoder for hybrid beamforming.

For hybrid beamforming, a digital beam coefficient is designed separately as an analog beam pre-compensation part and a fine-tuning part. A final digital codebook is designed in consideration of analog beamforming updated in a long-term period. That is, the same design rule may be maintained irrespective of an analog beam angle.

FIG. 9 is a view illustrating pre-compensation for analog beamforming in a hybrid beamforming process.

Herein, if the direction of a final beam is set to 35° by rotating total beams by $\phi=30°$ through analog beamforming and additionally by $\psi=5°$ through digital beamforming in an environment in which $N_t=16$, $N_t^{RF}=4$, and $N_{RF}=4$, the digital beamforming coefficients are given as [Equation 20].

$$v = = \begin{bmatrix} v_1 \\ v_2 \\ v_3 \\ v_4 \end{bmatrix} = \begin{bmatrix} 1 \\ e^{j\pi \cdot 4 \cdot 1 \cdot \sin(30°)} \\ e^{j\pi \cdot 4 \cdot 2 \cdot \sin(30°)} \\ e^{j\pi \cdot 4 \cdot 3 \cdot \sin(30°)} \end{bmatrix} \oplus$$ [Equation 20]

$$\begin{bmatrix} 1 \\ e^{-j\pi \cdot 4 \cdot 1 \cdot \sin(35°)} \\ e^{-j\pi \cdot 4 \cdot 2 \cdot \sin(35°)} \\ e^{-j\pi \cdot 4 \cdot 3 \cdot \sin(35°)} \end{bmatrix} = \begin{bmatrix} 1 \\ e^{j\pi \cdot 4 \cdot \sin(30°)} \\ e^{j\pi \cdot 8 \cdot \sin(30°)} \\ e^{j\pi \cdot 12 \cdot \sin(30°)} \end{bmatrix} \oplus \begin{bmatrix} 1 \\ e^{-j\pi \cdot 4 \cdot \sin(35°)} \\ e^{-j\pi \cdot 8 \cdot \sin(35°)} \\ e^{-j\pi \cdot 12 \cdot \sin(35°)} \end{bmatrix}$$

A final antenna array response vector reflecting [Equation 20] is given as [Equation 21].

$$\Sigma a(\theta) = (1 + \exp(j\pi[\sin(\theta) - \sin(\phi)]) + \quad \text{[Equation 21]}$$
$$\exp(j\pi 2[\sin(\theta) - \sin(\phi)]) +$$
$$\exp(j\pi 3[\sin(\theta) - \sin(\phi)])) \times$$
$$(v_1 + \exp(j\pi 4[\sin(\theta) - \sin(\phi)]) \cdot$$
$$v_2 + \exp(j\pi 8[\sin(\theta) - \sin(\phi)]) \cdot$$
$$v_3 + \exp(j\pi 12[\sin(\theta) - \sin(\phi)]) \cdot v_4)$$
$$= (1 + \exp(j\pi[\sin(\theta) - \sin(\phi)]) +$$
$$\exp(j\pi 2[\sin(\theta) - \sin(\phi)]) +$$
$$\exp(j\pi 3[\sin(\theta) - \sin(\phi)])) \times$$
$$\begin{pmatrix} 1 + \exp(j\pi 4[\sin(\theta) - \sin(\phi) + \sin(\phi) - \\ \sin(\phi + \psi)]) + \exp(j\pi 8[\sin(\theta) - \sin(\phi) + \\ \sin(\phi) - \sin(\phi + \psi)]) + \exp(j\pi 12[\sin(\theta) - \\ \sin(\phi) + \sin(\phi) - \sin(\phi + \psi)]) \end{pmatrix}$$
$$= (1 + \exp(j\pi[\sin(\theta) - \sin(\phi)]) +$$
$$\exp(j\pi 2[\sin(\theta) - \sin(\phi)]) +$$
$$\exp(j\pi 3[\sin(\theta) - \sin(\phi)])) \times$$
$$(1 + \exp(j\pi 4[\sin(\theta) - \sin \phi + (\psi)]) +$$
$$\exp(j\pi 8[\sin(\theta) - \sin(\phi + \psi)]) +$$
$$\exp(j\pi 12[\sin(\theta) - \sin(\phi + \psi)]))$$

For $\phi=30°$ in [Equation 21], if a final beamforming rotation angle is set to 35° by applying $\psi$++5°, the final antenna array response vector is determined by [Equation 22].

$$\Sigma a(\theta) = (1 + \exp(j\pi[\sin(\theta) - \sin(30°)]) + \exp(j\pi 2[\sin(\theta) - \sin(30°)]) + \exp(j\pi 3[\sin(\theta) - \sin(30°)])) \times (1 + \exp(j\pi 4[\sin(\theta) - \sin(35°)]) + \exp(j\pi 8[\sin(\theta) - \sin(35°)]) + \exp(j\pi 12[\sin(\theta) - \sin(35°)])) \quad \text{[Equation 22]}$$

Figure 11:
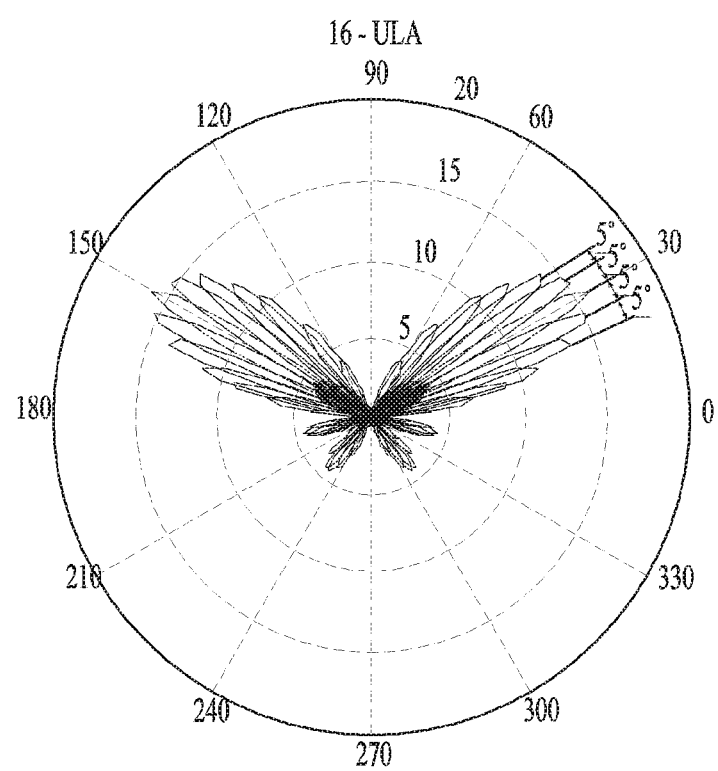
FIG. 11 is a view illustrating a final antenna array response vector obtained by performing fine-tuning digital beamforming with respect to a fixed analog beamforming angle.

FIG. 11 illustrates a final antenna array response vector achieved by performing fine-tuning digital beamforming with respect to a fixed analog beamforming angle. Specifically, FIG. 11 illustrates a final antenna array response vector achieved by performing fine-tuning digital beamforming at $\psi=0, \pm 5°, \pm 10°, \pm 15°$ with respect to $\phi=30°$. As illustrated in FIG. 11, it may be noted that a hybrid beam is controlled accurately in units of 5 degrees through pre-compensation for analog beamforming.

As described before, pure analog beamforming requires beam scanning in the time domain, for beam estimation at a transmission/receiving end. That is, for beam estimation, a time of $K_T \times K_R$ where $K_T$ and $K_R$ represent the numbers of transmission beams and reception beams, respectively. Upon completion of the analog beam estimation process, a UE may feed back a beam identifier (ID) having the largest signal strength to a BS.

Let a time taken for one beam scanning be denoted by $t_s$. Then, a total estimated time $T_s$ for transmission and reception beams may be expressed as [Equation 23].

$$T_S = t_s \times (K_T \times K_R) \quad \text{[Equation 23]}$$

Referring to [Equation 19], on the assumption that the total number of transmission beams is given by $K_T=L$ and the number of reception beams is given by $K_T=1$, the total number of candidate beams is L, and thus L time periods are required in the time domain.

Figure 12:
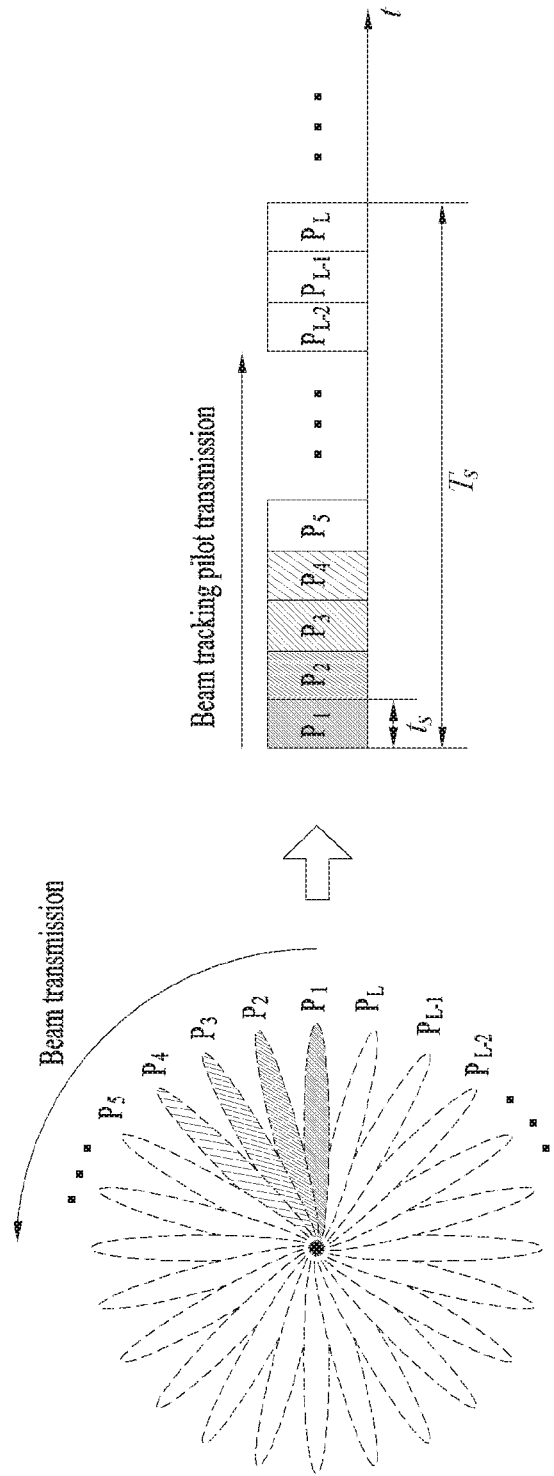
FIG. 12 is a view illustrating exemplary beam estimation periods in the time domain, required for analog beam tracking.

FIG. 12 is a view illustrating exemplary beam estimation periods in the time domain, required for analog beam tracking.

Referring to FIG. 12, it may be noted that for analog beam estimation, it is possible to estimate only one beam during one time period, and L time periods are required to estimate a total of L beams. In other words, it may be noted that as the number of individual beams increases due to an increase in the number of transmission/reception antennas, a longer training time is required.

As described before, analog beam scanning requires a training period in a given time area for beam estimation at a transmission/receiving end. Upon completion of the beam scanning process, each UE feeds back a beam ID having the largest signal strength to a BS.

However, if a number of users are densely populated in a narrow area, preferred beam ID feedback overhead and a time delay involved in analog beam estimation may rapidly increase. Particularly, beam sharpness is limited in legacy codebook-based analog beam estimation, thus making it difficult to separate and distinguish beams for each of densely populated users and distributed antenna arrays of the users. To solve this problem, a beam resolution should be increased, which eventually means the increase of a codebook size. However, since a UE should determine a precoder based on channel information measured by the UE and feed back information about the determined precoder in the form of a PMI in a current wireless communication system, increasing a beam resolution for fine beam direction adjustment may result in an increase of a codebook size and thus a feedback size. That is, the increase of feedback overhead may be inevitable.

Meanwhile, it is possible to estimate only one beam in the same time period. Thus, a training time required for analog beam scanning is proportional to the total number of candidate beams and the number of users. However, since data transmission is impossible during a beam training period, a system transmission rate is inevitably lost.

Accordingly, the present disclosure proposes methods for reducing a beam scanning delay by skipping beam scanning for the remaining users except for some (or representative) user among a plurality of densely populated users, based on cooperation between users. The present disclosure may be performed in the following two steps.

<First Step>

ABS groups users densely populated in a narrow area, sets a certain (representative) UE for the group, and notifies the UE that the UE is a header UE selected by the BS. Herein, although only one UE may be selected as a header UE, two or more UEs may be selected as header UEs.

The header UE selected by the BS performs analog transmission/reception beam scanning, and feeds back a determined preferred analog beam ID. Further, since each user, that is, each UE has agreed on the role of a header UE, the UE may skip analog beam scanning and related feedback.

<Second Step>

Subsequently, the header UE(s) selected by the BS performs analog beam scanning, and feeds back a preferred analog beam ID to the BS. This analog beam scanning and preferred beam information feedback is performed not by all UEs within the group but by the header UE(s) only.

Particularly, a training time required for analog beam scanning is proportional to the total number of candidate beams and the number of users. Therefore, if each user experiences similar channel characteristics in a dense user environment, it is possible to apply a method for reducing a beam scanning delay by limiting users participating in beam scanning to some user (or a header UE) within a group and sharing preferred beam information acquired by the header UE, based on cooperation between users.

Meanwhile, member UEs of the group which do not perform analog beam scanning may acquire analog beam direction information for the member UEs in the following manner.

The BS may indicate a feedback analog beam ID received from the header UE to the member UEs. That is, the BS may indicate feedback analog beam information to the member UEs of the group, which do not perform beam scanning, by broadcasting or multicasting the analog beam information.

Or the header UE(s) may indicate analog beam information determined by the header UE(s) to the member UEs of the group. Particularly, when the header UE(s) feeds back preferred analog beam information, adjacent UEs, that is, the member UEs may acquire the analog beam information by overhearing the analog beam information.

In the present disclosure, overhearing may refer to acquisition of UE-specific information, for example, uplink control information (UCI) for another UE by a specific UE. Specifically, overhearing may include acquisition of encryption key information for UCI for another UE and decoding and/or acquisition of the UCI for the UE using the acquired encryption key information by a specific UE. In another example, overhearing may include acquisition of C-RNTI information for another UE and decoding and/or acquisition of UCI for the UE using the acquired C-RNTI information by a specific UE.

The present disclosure provides the effect of reducing a beam scanning delay by skipping beam scanning for densely populated some (member) users based on cooperation between the users. Further, the proposed scheme is more suitable for the case where small-size UEs are densely populated in a narrow region or transmission/reception antenna patterns are similar for densely populated UEs.

While it has been described that a plurality of UEs densely populated in a narrow region are defined as a UE group in the present disclosure, the UE group may be replaced with an antenna group being a set of reception antennas. That is, one or more representative antennas may be determined for the antenna group, and reception beam scanning and a related feedback may be performed at the representative antennas. However, in this case, if the antenna group includes a single receiving end, a transmitting end may not need to provide the feedback to the receiving end.

Figure 13:
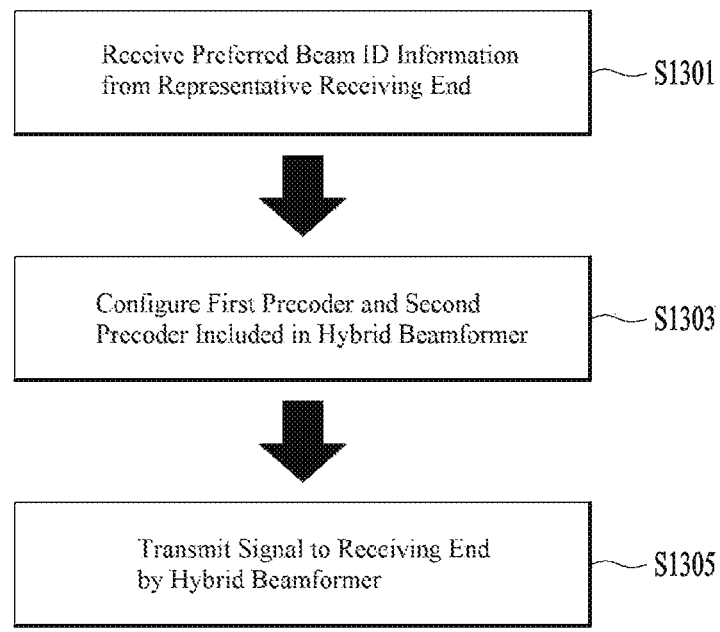
FIG. 13 is a flowchart illustrating a method for transmitting a signal by hybrid beamforming according to an embodiment of the present disclosure.

FIG. 13 is a flowchart illustrating a method for transmitting a signal by hybrid beamforming according to an embodiment of the present disclosure.

Referring to FIG. 13, a transmitting end, that is, a BS receives preferred beam ID information from a representative receiving end among a plurality of receiving ends densely populated in a narrow region in step 1301. Herein, the plurality of receiving ends include a receiving end to which the transmitting end intends to transmit a signal. The representative receiving end may be the receiving end. That is, only the representative receiving end among the plurality of receiving ends performs beam scanning to generate the preferred beam ID information. Preferably, the transmitting end may select the representative receiving end from among the plurality of receiving ends, and transmits information about the representative receiving end to the plurality of receiving ends.

Continuously, the transmitting end configures a hybrid beamformer based on the preferred beam ID information in step 1303. Specifically, the transmitting end configures a first precoder that steers the signal in a first beam direction, and a second precoder that steers the signal in a direction of the receiving end with respect to the first beam direction.

While obviously, the transmitting end may transmit the preferred beam ID information to the remaining receiving ends except for the representative receiving end, the remaining receiving ends except for the representative receiving end among the plurality of receiving ends may receive the preferred beam ID information from the representative receiving end. Further, feedback information for the second precoder is preferably received from the receiving end.

Finally, the transmitting end transmits a signal to the receiving end, using a hybrid beamformer including the first precoder and the second precoder in step 1305.

Figure 14:
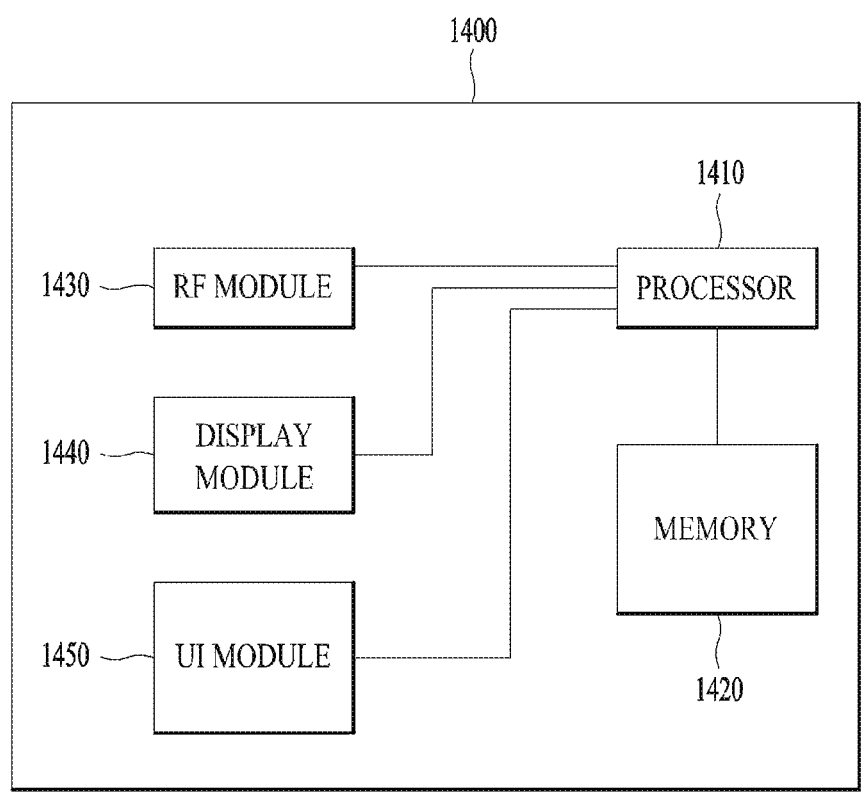
FIG. 14 is a block diagram of a communication apparatus according to an embodiment of the present disclosure.

FIG. 14 is a block diagram of a communication apparatus according to one embodiment of the present invention.

Referring to FIG. 14, a communication apparatus 1400 includes a processor 1410, a memory 1420, a radio frequency (RF) module 1430, a display module 1440 and a user interface module 1450.

The communication apparatus 1400 is shown for convenience of description and some modules thereof may be omitted. In addition, the communication apparatus 1400 may further include necessary modules. In addition, some modules of the communication apparatus 1400 may be subdivided. The processor 1410 is configured to perform an operation of the embodiment of the present invention described with reference to the drawings. For a detailed description of the operation of the processor 1410, reference may be made to the description associated with FIGS. 1 to 13.

The memory 1420 is connected to the processor 1410 so as to store an operating system, an application, program code, data and the like. The RF module 1430 is connected to the processor 1410 so as to perform a function for converting a baseband signal into a radio signal or converting a radio signal into a baseband signal. The RF module 1430 performs analog conversion, amplification, filtering and frequency up-conversion or inverse processes thereof. The display module 1440 is connected to the processor 1410 so as to display a variety of information. As the display module 1440, although not limited thereto, a well-known device such as a Liquid Crystal Display (LCD), a Light Emitting Diode (LED), or an Organic Light Emitting Diode (OLED) may be used. The user interface module 1450 is connected to the processor 1410 and may be configured by a combination of well-known user interfaces such as a keypad and a touch screen.

The above-described embodiments are proposed by combining constituent components and characteristics of the present disclosure according to a predetermined format. The individual constituent components or characteristics should be considered optional on the condition that there is no additional remark. If required, the individual constituent components or characteristics may not be combined with other components or characteristics. In addition, some constituent components and/or characteristics may be combined to implement the embodiments of the present disclosure. The order of operations disclosed in the embodiments of the present disclosure may be varied. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

In this document, a specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the terms fixed station, Node B, eNode B (eNB), access point, etc.

The embodiments of the present disclosure can be implemented by a variety of means, for example, hardware, firmware, software, or a combination thereof. In the case of implementing the present disclosure by hardware, the present disclosure can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present disclosure are implemented by firmware or software, the present disclosure can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present disclosure without departing from the spirit or scope of the disclosure. Thus, it is intended that the present disclosure covers the modifications and variations of this disclosure provided they come within the scope of the appended claims and their equivalents.

What is claimed is:

1. A method for transmitting a signal by a base station (BS) in a wireless communication system, the method comprising:
   configuring a plurality of adjacent user equipments (UEs) as a group;
   selecting a first UE from the group, wherein beam scanning is performed only in the first UE;
   receiving, from the first UE, preferred beam identifier (ID) information according to the beam scanning;
   configuring a hybrid beamformer based on the preferred beam ID information, wherein the hybrid beamformer includes a first precoder and a second precoder; and
   transmitting, to a second UE in the group, the signal using the hybrid beamformer, wherein the second UE is different from the first UE, and
   wherein the first precoder steers the signal in a first beam direction, and
   wherein the second precoder steers the signal in a direction of the second UE with reference to the first beam direction.

2. The method of claim 1, further comprising:
   transmitting information about the first UE to the group.

3. The method of claim 1, wherein only the first UE performs beam scanning to generate the preferred beam ID information.

4. The method of claim 1, further comprising transmitting the preferred beam ID information to remaining UEs except for the first UE among the group.

5. The method of claim 1, further comprising receiving feedback information for the second precoder from the second UE.

6. A base station (BS) for transmitting a signal in a wireless communication system, the BS comprising:
   a wireless communication module; and
   a processor for processing the signal,
   wherein the processor is configured to;
   configure a plurality of adjacent user equipments (UEs) as a group,
   select a first UE from the group, wherein beam scanning is performed only in the first UE,
   control the wireless communication module to receive, from the first UE, preferred beam identifier (ID) information according to the beam scanning,
   configure a hybrid beamformer based on the preferred beam ID information, wherein the hybrid beam former includes a first precoder and a second precoder, and
   control the wireless communication module to transmit, to a second UE in the group, the signal using the hybrid beamformer, wherein the second UE is different from the first UE,
   wherein the first precoder steers the signal in a first beam direction, and
   wherein the second precoder steers the signal in a direction of the second UE with reference to the first beam direction.

7. The BS of claim 6, wherein the processor is configured to control the wireless communication module to transmit information about the first UE to the group.

8. The BS of claim 6, wherein only the first UE performs beam scanning to generate the preferred beam ID information.

9. The BS of claim 6, wherein the processor is configured to control the wireless communication module to transmit the preferred beam ID information to remaining UEs except for the first UE among the group.

10. The BS of claim 6, wherein the processor is configured to control the wireless communication module to receive feedback information for the second precoder from the second UE.

* * * * *